(12) United States Patent
Matta

(10) Patent No.: US 11,074,569 B2
(45) Date of Patent: Jul. 27, 2021

(54) METHOD AND APPARATUS TO LIMIT FRAUD IN CREDIT CARD TRANSACTIONS

(71) Applicant: JPMorgan Chase Bank, N.A., New York, NY (US)

(72) Inventor: Mohit Matta, Bear, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/800,387

(22) Filed: Feb. 25, 2020

(65) Prior Publication Data

US 2020/0279244 A1 Sep. 3, 2020

Related U.S. Application Data

(60) Provisional application No. 62/811,968, filed on Feb. 28, 2019.

(51) Int. Cl.
*G06Q 20/32* (2012.01)
*G06Q 20/40* (2012.01)
*G06Q 20/20* (2012.01)

(52) U.S. Cl.
CPC ......... *G06Q 20/3224* (2013.01); *G06Q 20/20* (2013.01); *G06Q 20/409* (2013.01)

(58) Field of Classification Search
CPC .............. G06Q 20/3224; G06Q 20/409
See application file for complete search history.

(56) References Cited

U.S. PATENT DOCUMENTS

| 2013/0124346 A1* | 5/2013 | Baldwin | G06Q 20/353 |
| | | | 705/16 |
| 2013/0159121 A1* | 6/2013 | May | G06Q 20/00 |
| | | | 705/26.1 |
| 2017/0221058 A1* | 8/2017 | Choudhary | G06Q 20/401 |

* cited by examiner

*Primary Examiner* — A. Hunter Wilder
(74) *Attorney, Agent, or Firm* — Greenblum & Bernstein, P.L.C.

(57) ABSTRACT

Various methods, apparatuses, and media for preventing fraud in card or mobile transaction are provided. A fraud prevention application module defines one or more geographical zones where a card or mobile transaction is authorized. Information related to the defined geographical zones are stored onto a memory. A processor is configured to initiate the card or mobile transaction at a point-of-sale (POS) location; determine whether the POS location corresponds to the stored information related to one or more of the defined geographical zones; and authorize the card or mobile transaction based on a determination that the POS location corresponds to the stored information related to the defined one or more geographical zones.

14 Claims, 7 Drawing Sheets

METHOD AND APPARATUS TO LIMIT FRAUD IN CREDIT CARD TRANSACTIONS

CROSS-REFERENCE TO RELATED APPLICATIONS

This application claims the benefit of U.S. Provisional Patent Application Ser. No. 62/811,968 filed Feb. 28, 2019, which is hereby incorporated by reference in its entirety.

TECHNICAL FIELD

This disclosure generally relates to detect fraud in credit card transactions, and, more particularly, to methods and apparatuses for implementing a fraud prevention application module to allow a client device to draw a demographic region within a map for payment media such as card (credit/debit/gift card etc.) or mobile (Apple Pay, Chase Pay, Android Pay, Samsung Pay etc.) to be utilized in limiting fraud in card or mobile transactions.

BACKGROUND

Today, credit card (or the like) usage is virtually a part of a customer's daily life because customers recognize the many advantages of obtaining credit cards. For example, credit cards are safer to carry than money, and they can help a customer to establish a good credit rating. Additionally, they can serve as a source of convenience should the customer need to make an unexpected purchase for which they may not have the cash immediately available. Unfortunately, credit cards are also vulnerable to fraud and abuses. As credit card use increases in recent years, fraud and credit abuse cases are on the rise as well. A fraud (or "credit card fraud") occurs when a fraudster misappropriates someone else's credit card or credit information and puts the card or information to unauthorized uses (e.g., fraudulent credit applications or unauthorized purchases). Both types of credit misuses can be costly to cardholders as well as card issuers. Cardholders victimized by credit card fraud may face unexpected financial liability and may find their credit ratings damaged. A significant portion of the financial losses due to fraud and credit abuse usually rest on the card issuers. Major card issuers typically have to absorb hundreds of thousands of dollars in fraud losses every month.

A number of solutions have been proposed or implemented to fight fraud and credit abuse. However, regardless of strong fraud prevention decision engines, fraud may happen, for example, stolen cards may be used at merchant and authorization and transactions may get approved. Cards may get skimmed and authorizations may be approved before fraud alert is triggered or customer reports dispute or stolen card. Issuing banks may not want to make fraud rules extremely stringent to avoid bad experience for customers by declining valid transactions. Typically, majority of physical cards that get stolen are fraudulently used more than fifty (50) miles away from regular usage by a customer (original card owner).

In view of the foregoing, it would be desirable to provide a solution for detecting and processing fraud and credit abuse which overcomes the above-described deficiencies and shortcomings.

SUMMARY

The present disclosure, through one or more of its various aspects, embodiments, and/or specific features or sub-components, provides, inter alia, various systems, servers, devices, methods, media, programs, and platforms for implementing a fraud prevention application module between a client device (e.g., card owner's device) and a server device (e.g., an issuer of the card's device). The various aspects, embodiments, features, and/or sub-components provide optimized processes of implementing a fraud protection application module to allow a customer to participate or define geo-zones where transaction may be approved or limit the amount of transactions as customer may have best information on where they "plan" to use the card. The server device (i.e., issuing bank's device) may use this in addition to other analytical requirements which the server device may implement to detect or limit fraud and determine whether to approve or deny card transactions.

According to an aspect of the present disclosure, a method for preventing fraud in card or mobile transaction by utilizing one or more processors and one or more memories is disclosed. The method may include: defining, by utilizing a fraud prevention application module, one or more geographical zones where a card or mobile transaction is authorized; storing information related to the defined one or more geographical zones onto a memory; initiating, by a processor, the card or mobile transaction at a point-of-sale (POS) location; determining, by the processor, whether the POS location corresponds to the stored information related to one or more of the defined geographical zones; and automatically authorizing, by the processor, the card or mobile transaction based on a determination that the POS location corresponds to the stored information related to the one or more defined geographical zones.

According to another aspect of the present disclosure, the method may further include: defining, by utilizing the fraud prevention application module, an amount of transaction limit in each zone; storing information related to the amount of transaction limit onto the memory; and authorizing, by the processor, the card or mobile transaction based on a determination that an amount of transaction initiated by the processor at the POS corresponds to the stored information related to the amount of transaction limit associated with a zone corresponding to the POS among the one or more defined geographical zones.

According to yet another aspect of the present disclosure, the method may further include: automatically declining, by the processor, the card or mobile transaction based on a determination that the amount of transaction initiated by the processor at the POS does not correspond to the stored information related to the amount of transaction limit associated with a zone corresponding to the POS among the one or more defined geographical zones.

According to another aspect of the present disclosure, the method may further include: declining, by the processor, the card or mobile transaction based on a determination that the amount of transaction initiated by the processor at the POS does not correspond to the stored information related to the amount of transaction limit associated with a zone corresponding to the POS among the one or more defined geographical zones; sending, by the processor, a notification to a user's computing device that initiated the card or mobile transaction that the transaction has been declined; modifying, by the processor, the amount of transaction limit to a new amount of transaction limit to correspond to the amount of transaction initiated by the processor at the POS location; storing information related to the new amount of transaction limit onto the memory; and authorizing, by the processor, the card or mobile transaction based on a determination that the amount of transaction initiated by the processor at the POS corresponds to the stored information related to the new amount of transaction limit.

According to yet another aspect of the present disclosure, the method may further include: automatically declining, by the processor, the card or mobile transaction based on a determination that the POS location does not correspond to the stored information related to the defined one or more geographical zones.

According to a further aspect of the present disclosure, the method may further include: declining, by the processor, the card or mobile transaction based on a determination that the POS location does not correspond to the stored information related to the defined one or more geographical zone; sending, by the processor, a notification to a user's device that initiated the card or mobile transaction that the transaction has been declined; and defining, by utilizing the fraud prevention application module, a new geographical zone to correspond to the POS location that does not correspond to the stored information related to previously defined one or more geographical zones; updating, by the processor, the memory by storing the new geographical zone; and authorizing, by the processor, the card or mobile transaction based on a determination that the POS location corresponds to the stored information related to the defined new geographical zone.

According to another aspect of the present disclosure, the method may further include: declining, by the processor, the card or mobile transaction based on a determination that the POS location does not correspond to the stored information related to the defined one or more geographical zones; sending, by the processor, a notification to a user's device that initiated the card or mobile transaction that the transaction has been declined; receiving an authorization from the user's device to process the card or mobile transaction even though the POS location does not correspond to the stored information related to the defined one or more geographical zones; and authorizing, by the processor, the card or mobile transaction based on the received authorization from the user's device.

According to a further aspect of the present disclosure, a system for preventing fraud in card or mobile transaction is disclosed. The system may include: a memory; and a processor operatively connected to the memory via a communication network. The processor may be configured to: define one or more geographical zones where a card or mobile transaction is authorized; store information related to the defined one or more geographical zones onto the memory; initiate the card or mobile transaction at a point-of-sale (POS) location; determine whether the POS location corresponds to the stored information related to one or more of the defined geographical zones; and automatically authorize the card or mobile transaction based on a determination that the POS location corresponds to the stored information related to the defined one or more geographical zones.

According to another aspect of the present disclosure, the processor may be further configured to: define an amount of transaction limit in each zone; store information related to the amount of transaction limit onto the memory; and authorize the card or mobile transaction based on a determination that an amount of transaction initiated by the processor at the POS corresponds to the stored information related to the amount of transaction limit associated with a zone corresponding to the POS among the one or more defined geographical zones.

According to an additional aspect of the present disclosure, the processor may be further configured to: automatically decline the card or mobile transaction based on a determination that the amount of transaction initiated by the processor at the POS does not correspond to the stored information related to the amount of transaction limit associated with a zone corresponding to the POS among the one or more defined geographical zones.

According to a further aspect of the present disclosure, the processor may be further configured to: decline the card or mobile transaction based on a determination that the amount of transaction initiated by the processor at the POS does not correspond to the stored information related to the amount of transaction limit associated with a zone corresponding to the POS among the one or more defined geographical zones; send a notification to a user's device that initiated the card or mobile transaction that the transaction has been declined; modify the amount of transaction limit to a new amount of transaction limit to correspond to the amount of transaction initiated by the processor at the POS location; store information related to the new amount of transaction limit onto the memory; and authorize the card or mobile transaction based on a determination that the amount of transaction initiated by the processor at the POS corresponds to the stored information related to the new amount of transaction limit.

According to yet another aspect of the present disclosure, the processor may be further configured to: automatically decline the card or mobile transaction based on a determination that the POS location does not correspond to the stored information related to the defined one or more geographical zones.

According to another aspect of the present disclosure, the processor may be further configured to: decline the card or mobile transaction based on a determination that the POS location does not correspond to the stored information related to the defined one or more geographical zones; send a notification to a user's device that initiated the card or mobile transaction that the transaction has been declined; define a new geographical zone to correspond to the POS location that does not correspond to the stored information related to previously defined one or more geographical zones; update the memory by storing the new geographical zone; and authorize the card or mobile transaction based on a determination that the POS location corresponds to the stored information related to the defined new geographical zone.

According to a further aspect of the present disclosure, the processor may be further configured to: decline the card or mobile transaction based on the determination that the POS location does not correspond to the stored information related to the defined one or more geographical zones; send a notification to a user's device that initiated the card or mobile transaction that the transaction has been declined; receive an authorization from the user's device to process the card or mobile transaction even though the POS location does not correspond to the stored information related to the defined one or more geographical zones; and authorize the card or mobile transaction based on the received authorization from the user's device.

According to another aspect of the present disclosure, a non-transitory computer readable medium configured to store instructions for preventing fraud in card or mobile transaction is disclosed. The instructions, when executed, may cause a processor to perform the following: defining, by utilizing a fraud prevention application module, one or more geographical zones where a card or mobile transaction is authorized; storing information related to the defined one or more geographical zones onto a memory; initiating, by a processor, the card or mobile transaction at a point-of-sale (POS) location; determining, by the processor, whether the POS location corresponds to the stored information related to one or more of the defined geographical zones; and automatically authorizing, by the processor, the card or mobile transaction based on a determination that the POS location corresponds to the stored information related to the one or more defined geographical zones.

According to yet another aspect of the present disclosure, the instructions, when executed, may further cause the processor to perform the following: defining, by utilizing the fraud prevention application module, an amount of transaction limit in each zone; storing information related to the amount of transaction limit onto the memory; and authorizing, by the processor, the card or mobile transaction based on a determination that an amount of transaction initiated by the processor at the POS corresponds to the stored information related to the amount of transaction limit associated with a zone corresponding to the POS among the one or more defined geographical zones.

According to a further aspect of the present disclosure, the instructions, when executed, may further cause the processor to perform the following: automatically declining, by the processor, the card or mobile transaction based on a determination that the amount of transaction initiated by the processor at the POS does not correspond to the stored information related to the amount of transaction limit associated with a zone corresponding to the POS among the one or more defined geographical zones.

According to another aspect of the present disclosure, the instructions, when executed, may further cause the processor to perform the following: declining, by the processor, the card or mobile transaction based on a determination that the amount of transaction initiated by the processor at the POS does not correspond to the stored information related to the amount of transaction limit associated with a zone corresponding to the POS among the one or more defined geographical zones; sending, by the processor, a notification to a user's computing device that initiated the card or mobile transaction that the transaction has been declined; modifying, by the processor, the amount of transaction limit to a new amount of transaction limit to correspond to the amount of transaction initiated by the processor at the POS location; storing information related to the new amount of transaction limit onto the memory; and authorizing, by the processor, the card or mobile transaction based on a determination that the amount of transaction initiated by the processor at the POS corresponds to the stored information related to the new amount of transaction limit.

According to yet another aspect of the present disclosure, the instructions, when executed, may further cause the processor to perform the following: automatically declining, by the processor, the card or mobile transaction based on a determination that the POS location does not correspond to the stored information related to the defined one or more geographical zones.

According to another aspect of the present disclosure, the instructions, when executed, may further cause the processor to perform the following: declining, by the processor, the card or mobile transaction based on a determination that the POS location does not correspond to the stored information related to the defined one or more geographical zone; sending, by the processor, a notification to a user's device that initiated the card or mobile transaction that the transaction has been declined; and defining, by utilizing the fraud prevention application module, a new geographical zone to correspond to the POS location that does not correspond to the stored information related to previously defined one or more geographical zones; updating, by the processor, the memory by storing the new geographical zone; and authorizing, by the processor, the card or mobile transaction based on a determination that the POS location corresponds to the stored information related to the defined new geographical zone.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
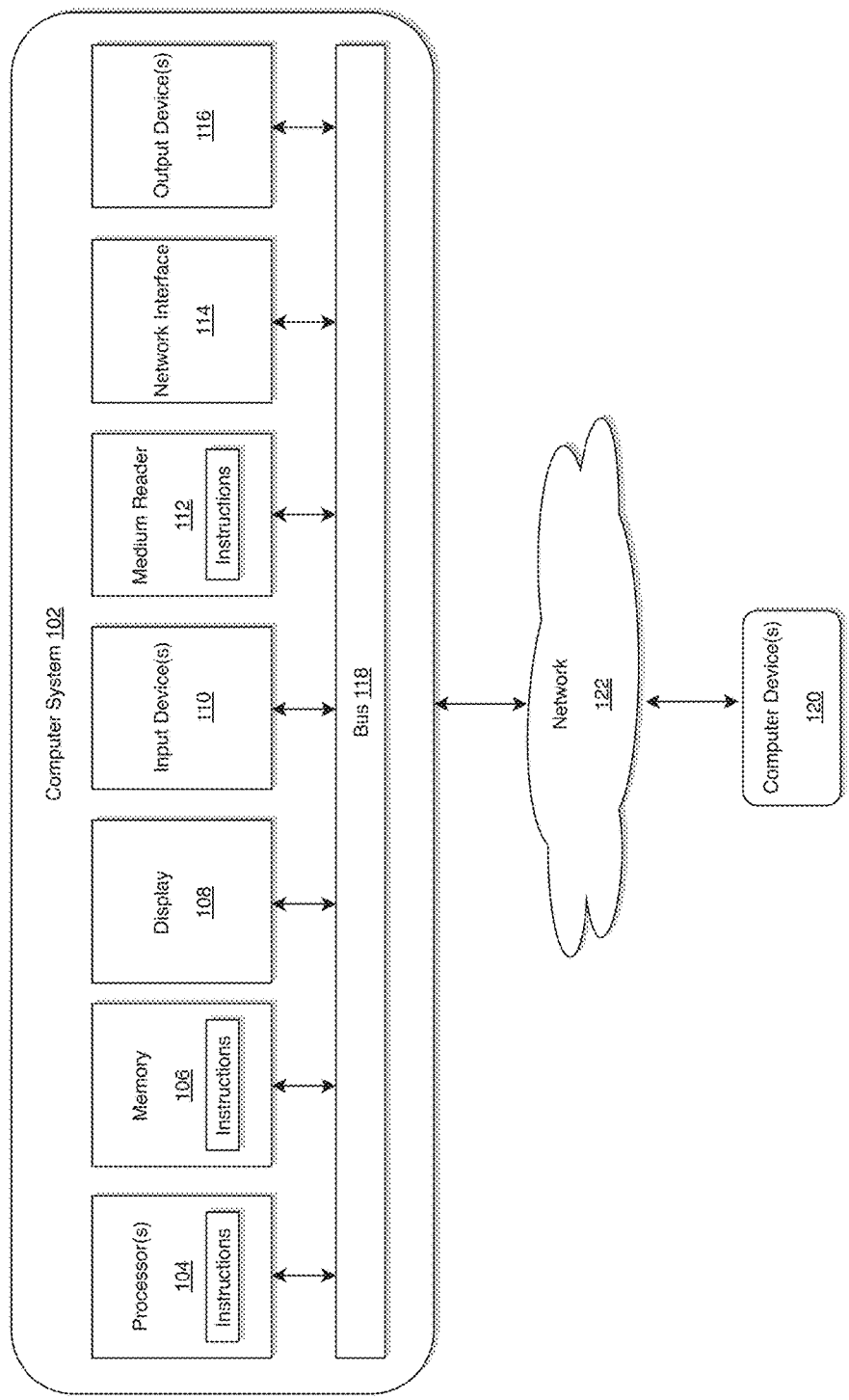
FIG. 1 illustrates a computer system for implementing a fraud prevention application module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a fraud prevention application module to allow a client device to draw a demographic region within a map for payment media such as card (credit/dedit/gift card etc.) or mobile (Apple Pay, Chase Pay, Android Pay, Samsung Pay etc.) to be utilized in limiting fraud in card or mobile transactions. By implementing such fraud prevention application module, the exemplary embodiments as disclosed herein may also improve network communication between a client device and a server device by limiting fraud in card of mobile transactions. The defined map may include any desired shape, e.g., circle, semi-circle, rectangular, square, oval, etc., but the disclosure is not limited thereto. For example, the defined map may include any shape defining a region by connection two end points (see, e.g., FIG. 4).

Figure 2:
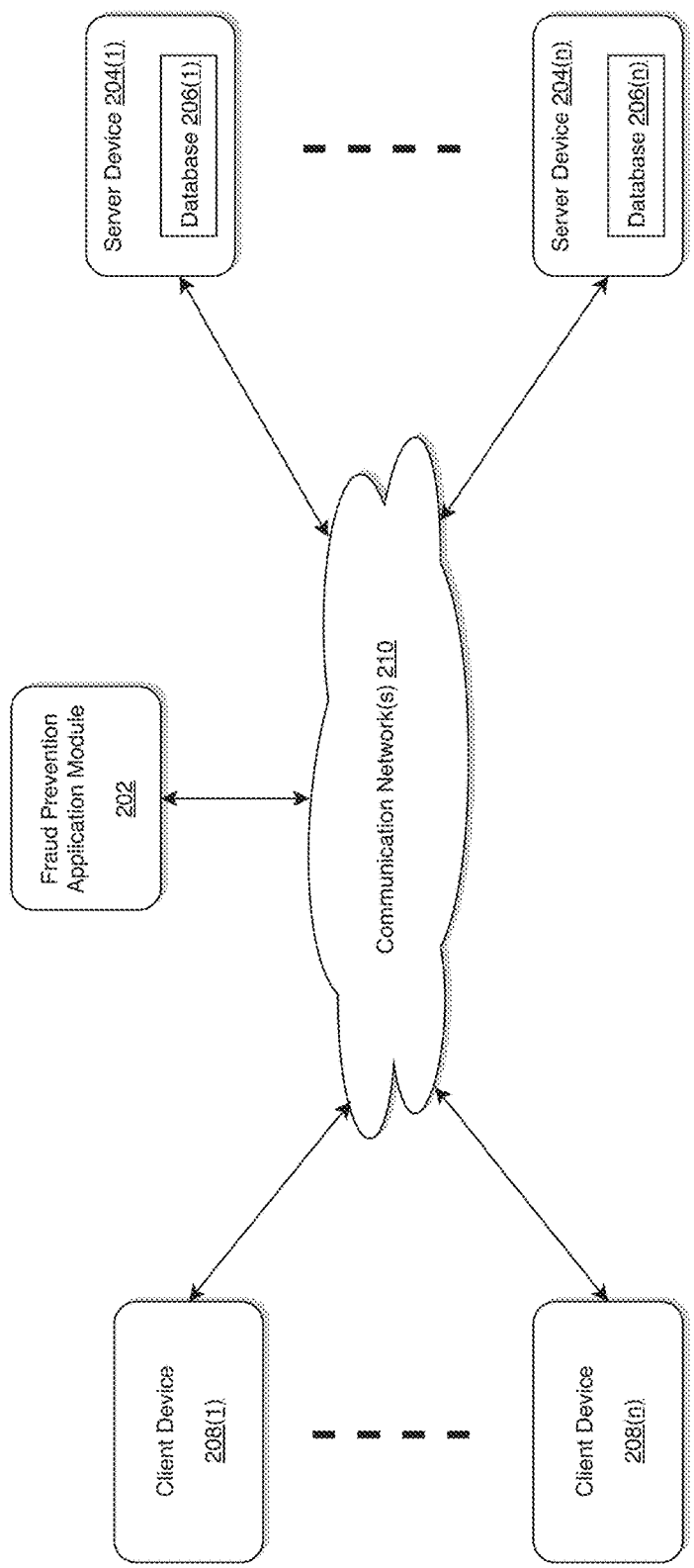
FIG. 2 illustrates an exemplary diagram of a network environment with a fraud prevention application module in accordance with an exemplary embodiment.

Referring to FIG. 2, a schematic of an exemplary network environment 200 for implementing a fraud prevention application module of the instant disclosure is illustrated. Conventionally, regardless of strong fraud prevention decision engines, fraud may happen, for example, stolen cards may be used at merchant and authorization and transactions may get approved. Cards may get skimmed and authorizations may be approved before fraud alert is triggered or customer reports dispute or stolen card. Issuing banks may not want to make fraud rules extremely stringent to avoid bad experience for customers by declining valid transactions. Typically, majority of physical cards that get stolen are fraudulently used more than fifty (50) miles away from regular usage by a customer (original card owner).

According to exemplary embodiments, the system may allow further reduction in the number of occurrences of card frauds by implementing a fraud prevention application module (FPAM) 202 as illustrated in FIG. 2. The FPAM 202 may be the same or similar to the computer system 102 as described with respect to FIG. 1. The FPAM 202 may store one or more applications that can include executable instructions that, when executed by the FPAM 202, cause the FPAM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the FPAM 202 itself, may be located in virtual server(s) running in a cloud-based computing environment rather than being tied to one or more specific physical network computing devices. Also, the application(s) may be running in one or more virtual machines (VMs) executing on the FPAM 202. Additionally, in one or more embodiments of this technology, virtual machine(s) running on the FPAM 202 may be managed or supervised by a hypervisor.

In the network environment 200 of FIG. 2, the FPAM 202 is coupled to a plurality of server devices 204(1)-204(n) that hosts a plurality of databases 206(1)-206(n), and also to a plurality of client devices 208(1)-208(n) via communication network(s) 210. A communication interface of the FPAM 202, such as the network interface 114 of the computer system 102 of FIG. 1, operatively couples and communicates between the FPAM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the FPAM 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and FPAM(s) 202 that efficiently limit fraud in card or mobile transactions. For example, the various aspects, embodiments, features, and/or sub-components provide optimized processes of implementing a FPAM 202 to allow a customer to participate or define geo-zones where card or mobile transaction may be approved or limit the amount of card or mobile transactions as customer may have best information on where they "plan" to use the card. The server devices 204(1)-204(n) (i.e., issuing bank's computing device) may use this information in addition to other analytical requirements which the server devices 204(1)-204(N) may implement to detect or limit fraud and determine whether to approve or deny card or mobile transactions.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The FPAM 202 may be a standalone device or integrated with one or more other devices or apparatuses, such as one or more of the server devices 204(1)-204(n), or one or more of the client devices 208(1)-208(n), for example. In one particular example, the FPAM 202 may include or be hosted by one of the client devices 208(1)-208(n), and other arrangements are also possible. Moreover, one or more of the devices of the FPAM 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the FPAM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the FPAM 202 into a practical application of efficiently limiting fraud in card or mobile transactions. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the FPAM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the FPAM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the FPAM 202, the server devices 204(1)-204(n), or the client devices 208(1)-208(n), for example, may be configured to operate as virtual instances on the same physical machine. For example, one or more of the FPAM 202, the server devices 204(1)-204(n), or the client devices 208(1)-208(n) may operate on the same physical device rather than as separate devices communicating through communication network(s) 210. Additionally, there may be more or fewer FPAMs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
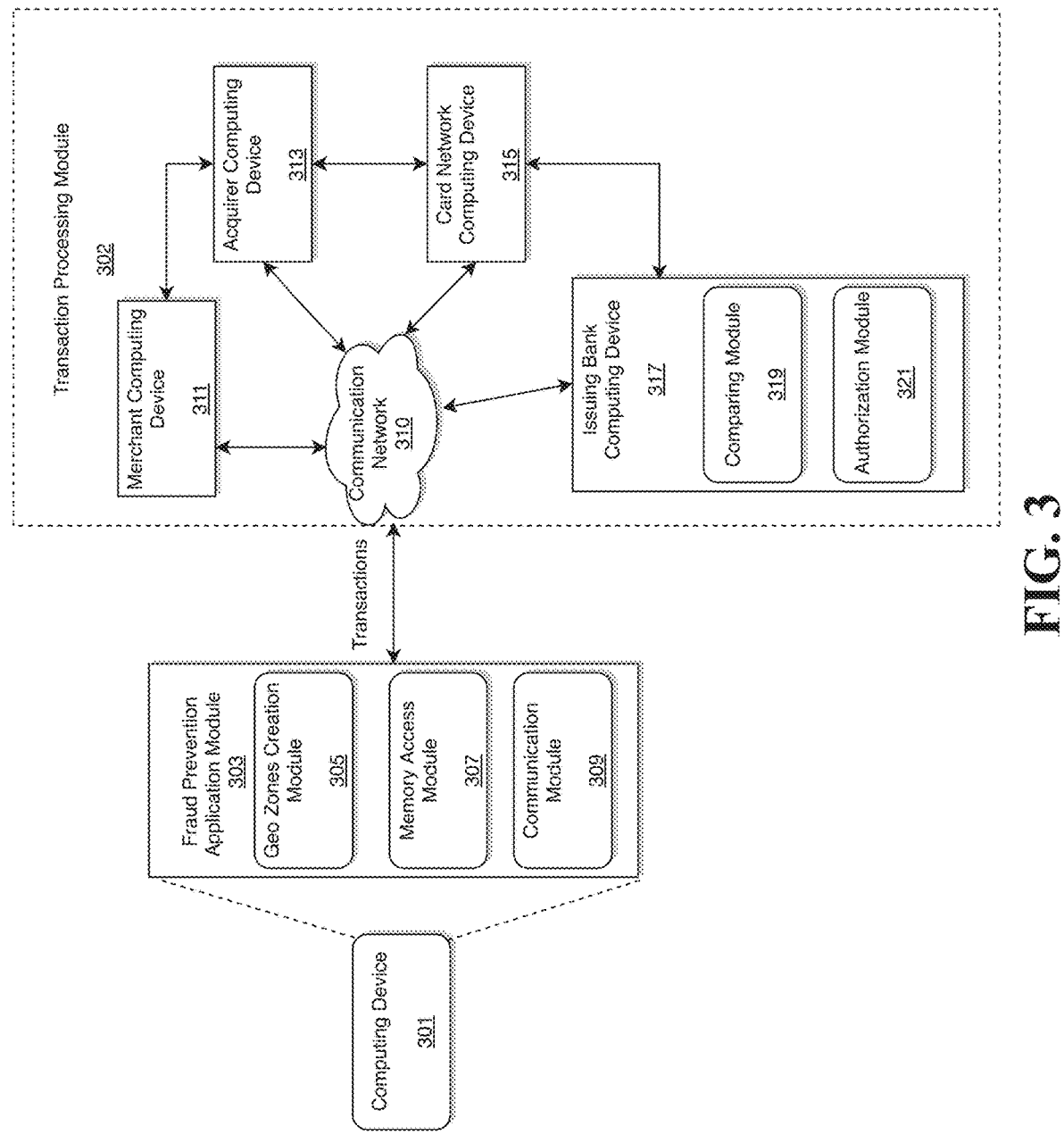
FIG. 3 illustrates a payment authorization diagram with a fraud prevention application module in accordance with an exemplary embodiment.
Figure 4:
FIG. 4 illustrates an exemplary geo map identified by a user of a fraud prevention application module in accordance with an exemplary embodiment.

FIG. 3 illustrates a payment authorization diagram with a fraud prevention application module in accordance with an exemplary embodiment. FIG. 4 illustrates an exemplary geo map identified by a user of a fraud prevention application module in accordance with an exemplary embodiment.

As depicted in FIG. 3, a computing device 301 may be coupled to a transactions processing module 302 via communication network 310. Although, in the exemplary embodiment as illustrated in FIG. 3, the communication network 310 is depicted as included within the transactions processing module 302, the disclosure is not limited thereto. In other exemplary embodiments, the communication network 310 may be a standalone communication network that connects/couples the computing device 301 to the transactions processing module 302.

As illustrated in FIG. 3, the computing device 301 may implement a fraud prevention application module (FPAM) 303 to allow a customer (a client using the computing device 301) to participate or define geo-zones where transaction may be approved or limit the amount of transactions as customer may have best information on where they "plan" to use the card. The transaction processing module 302 may use this in addition to other analytical requirements which the transaction processing module 302 may implement to detect or limit fraud and determine whether to approve or deny card transactions.

According to exemplary embodiments, the FPAM 303 may include a geo zones creation module 305, a memory access module 307, and a communication module 309. According to exemplary embodiments, the transaction processing module 302 may include a merchant computing device 311, an acquirer computing device 313, a card network computing device 315 and an issuing bank computing device 317. According to exemplary embodiments, the issuing bank computing device 317 may include a comparing module 319 and an authorization module. The communication network 310 may be the communication network 210 as disclosed herein with reference to FIG. 2.

Unlike conventional card or mobile transactions fraud prevention system, the computing device 301 of the instant disclosure may be configured to implement a FPAM 303 that may efficiently allow a customer (a client using the computing device 301) to participate or define geo-zones where transaction may be approved or limit the amount of transactions as customer may have best information on where they "plan" to use the card. The computing device 301 may be the same or similar to any one of the client devices 208(1)-208(n) as described with respect to FIG. 2, including any features or combination of features described with respect thereto. The FPAM 303 may be the same or similar to the FPAM 202 as described with respect to FIG. 2, including any features or combination of features described with respect thereto.

According to exemplary embodiments, each of geo zones creation module 305, memory access module 307, and communication module 310 of the FPAM 303 may be implemented by microprocessors or similar, and may be programmed using software (e.g., microcode) to perform various functions discussed herein and may optionally be driven by firmware and/or software. Alternatively, each of geo zones creation module 305, memory access module 307, and communication module 310 of the FPAM 303 may be implemented by dedicated hardware, or as a combination of dedicated hardware to perform some functions and a processor (e.g., one or more programmed microprocessors and associated circuitry) to perform other functions.

Since the computing device 301 as illustrated in FIG. 3 may be configured to implement FPAM 303 of the instant disclosure, a client (an original owner of a credit/debit/gift card, etc.) may use the geo zones creation module 305 to define a particular area/zone 401 (see FIG. 4) where transactions may be approved or limit the amount of transactions as the client may have the best information on where they "plan" to use the card. Geo zones defined by the client by utilizing the geo zones creation module 305 may be stored in the memory access module 307. Also, the amount of transactions that may be authorized to be charged may also be stored in the memory access module 307. Issuing bank computing device 317 may use this information stored in memory access module 307 in addition to other analytical requirements to authorize the transactions to further limit occurrences of fraud in card or mobile transactions.

For example, there may be three parties involved in authorization of card or mobile transactions. An acquirer is a financial institution that may enable merchants to process card or mobile transactions. The acquiring bank may pass the merchant's transactions to applicable issuing banks/network to receive payment (e.g., First Data, TSYS, Chase Paymentech) by utilizing the acquirer computing device 313. A card network is a network that may be configured to control where payment credit/debit/gift cards may be accepted and to facilitate transactions between merchants and card issuers (e.g., Visa, MasterCard, American Express, Discover) by utilizing the card network computing device 315. An issuing bank is a financial institution that issues credit/debit/gift cards to consumers on behalf of the card networks (e.g. Visa, MasterCard, American Express, Discover). Card networks may not actually issue credit cards to consumers. Instead, banks or credit unions may work with card networks to issue cards. The issuing bank of a credit/debit/gift card may be in charge of, by utilizing the issuing bank computing device 317, approving or denying credit card applications, issuing debit card to customers having DDA accounts (Saving, Checking etc.), paying for transactions on behalf of the cardholder, collecting payments from the cardholder, providing customer service, etc.

According to exemplary embodiments, each of comparing module 319 and authorization module 321 of the issuing bank computing device 317 may be implemented by microprocessors or similar, and may be programmed using software (e.g., microcode) to perform various functions discussed herein and may optionally be driven by firmware and/or software. Alternatively, each of comparing module 319 and authorization module 321 of the issuing bank computing device 317 may be implemented by dedicated hardware, or as a combination of dedicated hardware to perform some functions and a processor (e.g., one or more programmed microprocessors and associated circuitry) to perform other functions.

According to exemplary embodiments, each of the merchant computing device 311, acquirer computing device 313, card network computing device 315, and issuing bank computing device 317 may be the same or similar to any one of the server devices 204(1)-204(n) as described with respect to FIG. 2, including any features or combination of features described with respect thereto.

According to exemplary embodiments, the following process steps may be initiated by the computer system that implements the FPAM 303 when a client purchases using card-present transactions (not online).

A client may initiate a transaction by swiping or inserting physical card or using contactless payment e.g., using mobile device Apple Pay, showing bar code etc., at Point-of-Sale (POS). Merchant computing device 311 may transmit the transaction via the communication network 310 to the acquirer computing device 313. The acquirer computing device 313 may analyze the transaction and may determine an appropriate card network such as VISA, MasterCard etc., associated with the transaction. After determining the appropriate card network, the acquirer computing device 313 may transmit the transaction to the card network computing device 315 of the appropriate card network via the communication network 310. The card network computing device 315 may transmit the transaction to the issuing bank computing device 317 via the communication network 310.

After receiving the transaction, the comparing module 319 of the issuing bank computing device 317 compares the geo zone or transaction limit of the instant transaction to previously stored geo zones or transaction limit information defined by the geo zones creation module 305 to determine whether to authorize or deny the transaction. If the comparing module 319 determines that the geo zones or transaction limit of the instant transaction conforms to the stored geo zones or transaction limit information associated with the particular card that has been used in this transaction, the authorization module 321 process the transaction as valid and approves the transaction. The comparing module 319 may, in addition to the comparing of the geo zone or transaction limit of the instant transaction to previously stored geo zones or transaction limit information defined by the geo zones creation module 305, implement complex rules to determine whether a transaction is fraud. For example, the comparing module 319 use several logics based on previous transaction history, credit limit, amount in account etc., to make a decision to approve or deny the transaction. The comparing module 319 may also analyze several data elements such as reputation of merchant, location of merchant, type of merchant, last swipe of card etc., to make a decision to approve or deny the transaction.

If the comparing module 319 determines that the geo zones or transaction limit of the instant transaction does not conform to the stored geo zones or transaction limit information associated with the particular card that has been used in this transaction, the authorization module 321 process the transaction as invalid and disapproves the transaction. The authorization module 321 may receive a disapproval notification from the comparing module 319 and may transmit a message to the client via the communication network 310 that the transaction has been denied. The computing device 301 may receive such message via the communication module 309.

As illustrated in FIG. 3, the computing device 301 may implement a fraud prevention application module (FPAM) 303 to allow a customer (a client using the computing device 301 and the original card owner) to participate or define geo-zones where transaction may be approved or limit the amount of transactions as customer may have best information on where they "plan" to use the card. The comparing module 319 of the issuing bank computing device 317 may use this in addition to other analytical requirements mentioned above which the comparing module 319 may implement to detect or limit fraud and determine whether to approve or deny card transactions.

Unlike conventional card or mobile transactions fraud prevention system, the computing device 301 of the instant disclosure may be configured to implement a FPAM 303 that may efficiently allow a customer (a client using the computing device 301) to participate or define geo-zones where transaction may be approved or limit the amount of transactions by utilizing the geo zones creation module 305 as customer may have best information on where they "plan" to use the card.

According to exemplary embodiments, the FPAM 303 may allow a customer to predefine a zone or plurality of zones where payment should work by picking "zones" on map view (see FIG. 4) of issuer mobile app or web portal prior to initiating a transaction. The customer may have the best knowledge of where he/she usually shops or plan to shop. Thus, the customer should have opportunity to define multiple zones where authorization should work. According to exemplary embodiments, the customer may pick different authorization levels in different zones. For example, the customer may authorize up to $50 in zone 1, but up to $25 in zone 2, but the disclosure is not limited thereto. Issuing bank computing device 317 receives the zone information and transaction limit information on merchant POS location and stores such information for future references. Although FIG. 4 illustrates only one zone 401, the disclosure is not limited thereto. For example, FIG. 4 may illustrate a plurality of zones as desired by the customer. In addition, the customer may be allowed to update zone or transaction limit information at any time as desired by the customer.

For example, according to exemplary embodiments, in case transaction is declined by the authorization module 321 due to this zone implementation, the issuing bank computing device 317 may notify the customer (using text, e-mail, voice call etc.) the reasons to decline. The customer may immediately (in real time) modify zone or disable feature by utilizing the FPAM 303 and retry the transaction. Acquirer computing device 313 may obtain better Geo-location by enabling GPS type technology at POS.

Thus, according to the exemplary embodiments, unlike conventional card or mobile transactions fraud prevention system, the computing device 301 of the instant disclosure may be configured to implement a FPAM 303 that may efficiently allow a customer (a client using the computing device 301 and the original card owner) to participate or define geo-zones where transaction may be approved or limit the amount of transactions by utilizing the geo zones creation module 305 as customer may have best information on where they "plan" to use the card. The issuing bank computing device 317 may use this in addition to other analytical requirement to prevent or limit fraud in card or mobile transactions.

According to exemplary embodiments, a non-transitory computer readable medium may be configured to store instructions for implementing the FPAM 303 for automatically preventing fraud in card or mobile transaction. According to exemplary embodiments, the instructions, when executed, may cause a processor embedded within the FPAM 303 to perform the following: defining one or more geographical zones where a card or mobile transaction is authorized; storing information related to the defined one or more geographical zones onto a memory; initiating the card or mobile transaction at a point-of-sale (POS) location; determining whether the POS location corresponds to the stored information related to one or more of the defined geographical zones; and automatically authorizing the card or mobile transaction based on a determination that the POS location corresponds to the stored information related to the one or more defined geographical zones. The processor may be the same or similar to the processor 104 as illustrated in FIG. 1 or a processor embedded within the fraud prevention application module 202 as illustrated in FIG. 2 or a processor embedded within the computing device 301 as illustrated in FIG. 3.

According to exemplary embodiments, the geo-zones defined and selected by the FPAM 303 may be stored on one or all of the following computing devices: the computing device 301, the merchant computing device 311, and the issuing bank computing device 317. According to exemplary embodiments, each one of the computing devices 301, 311, and 317 may also be a mobile computing device (e.g., a cellular phone, tablet, mobile phone, etc.).

According to exemplary embodiments, the instructions, when executed, may further cause the processor to perform the following: defining, by utilizing the fraud prevention application module, an amount of transaction limit in each zone; storing information related to the amount of transaction limit onto the memory; and authorizing, by the processor, the card or mobile transaction based on a determination that an amount of transaction initiated by the processor at the POS corresponds to the stored information related to the amount of transaction limit associated with a zone corresponding to the POS among the one or more defined geographical zones.

According to exemplary embodiments, the instructions, when executed, may further cause the processor to perform the following: automatically declining, by the processor, the card or mobile transaction based on a determination that the amount of transaction initiated by the processor at the POS does not correspond to the stored information related to the amount of transaction limit associated with a zone corresponding to the POS among the one or more defined geographical zones.

According to exemplary embodiments, the instructions, when executed, may further cause the processor to perform the following: declining, by the processor, the card or mobile transaction based on a determination that the amount of transaction initiated by the processor at the POS does not correspond to the stored information related to the amount of transaction limit associated with a zone corresponding to the POS among the one or more defined geographical zones; sending, by the processor, a notification to a user's computing device that initiated the card or mobile transaction that the transaction has been declined; modifying, by the processor, the amount of transaction limit to a new amount of transaction limit to correspond to the amount of transaction initiated by the processor at the POS location; storing information related to the new amount of transaction limit onto the memory; and authorizing, by the processor, the card or mobile transaction based on a determination that the amount of transaction initiated by the processor at the POS corresponds to the stored information related to the new amount of transaction limit.

According to exemplary embodiments, the instructions, when executed, may further cause the processor to perform the following: automatically declining, by the processor, the card or mobile transaction based on a determination that the POS location does not correspond to the stored information related to the defined one or more geographical zones.

According to exemplary embodiments, the instructions, when executed, may further cause the processor to perform the following: declining, by the processor, the card or mobile transaction based on a determination that the POS location does not correspond to the stored information related to the defined one or more geographical zone; sending, by the processor, a notification to a user's device that initiated the card or mobile transaction that the transaction has been declined; and defining, by utilizing the fraud prevention application module, a new geographical zone to correspond to the POS location that does not correspond to the stored information related to previously defined one or more geographical zones; updating, by the processor, the memory by storing the new geographical zone; and authorizing, by the processor, the card or mobile transaction based on a determination that the POS location corresponds to the stored information related to the defined new geographical zone.

Figure 5:
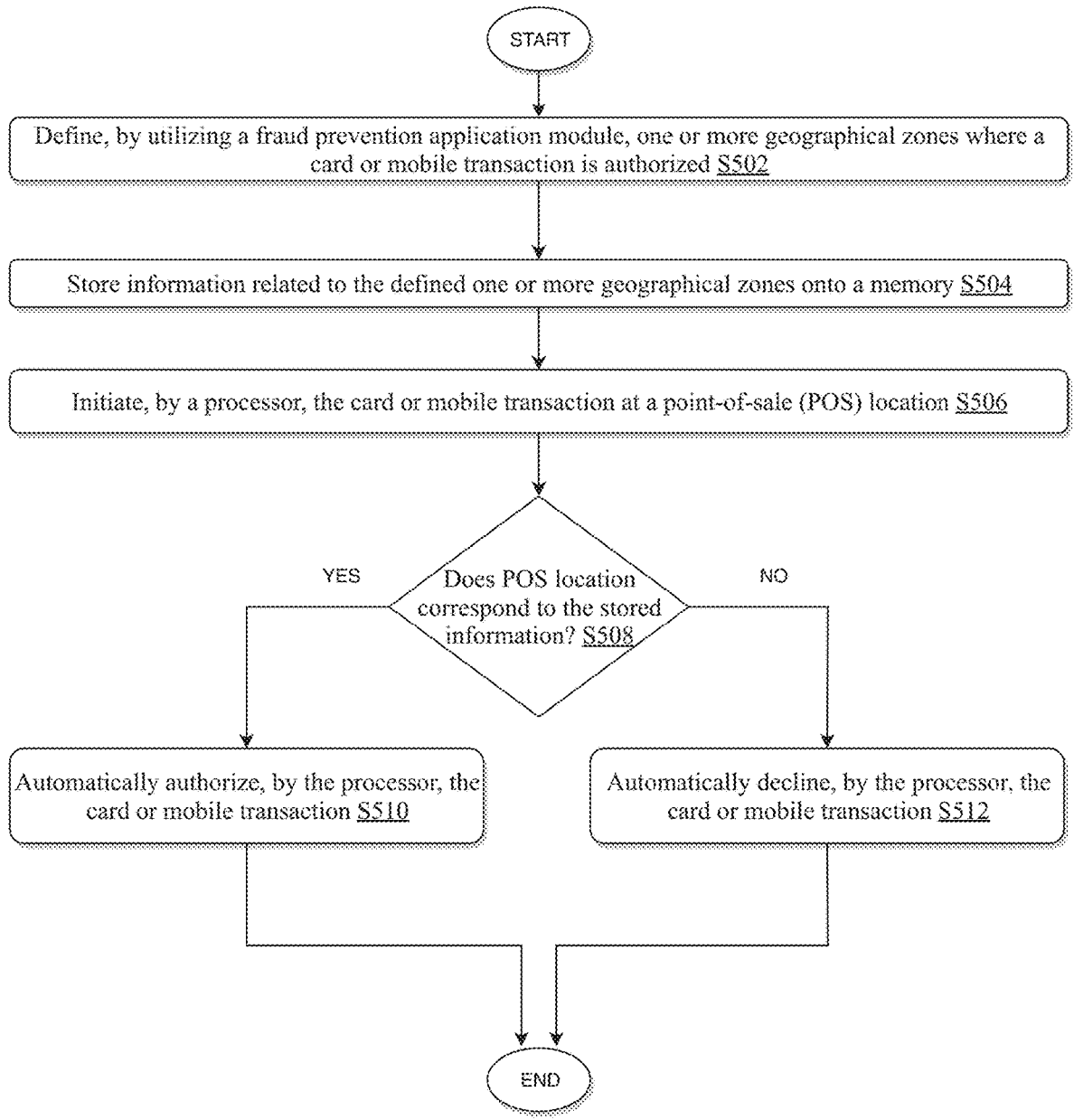
FIG. 5 illustrates a flow diagram for implementing a fraud prevention application module in accordance with an exemplary embodiment.

FIG. 5 illustrates a flow diagram for implementing a fraud prevention application module in accordance with an exemplary embodiment.

According to exemplary embodiments, in the process 500 of FIG. 5, at step S502, one or more geographical zones are defined where a card or mobile transaction is authorized by utilizing a fraud prevention application module. The fraud prevention application module may be the same or similar to the fraud prevention module 202 as illustrated in FIG. 2 of the fraud prevention module 303 as illustrated in FIG. 3, but the disclosure is not limited thereto.

At step S504, information related to the defined one or more geographical zones may be stored onto a memory. According to exemplary embodiments, the memory may be the same or similar to the memory 106 as illustrated in FIG. 1.

At step S506, a processor may initiate the card or mobile transaction at a point-of-sale (POS) location.

At step S508, a processor may determine whether the POS location corresponds to the stored information related to one or more of the defined geographical zones.

At step S510, the card or mobile transaction may be automatically authorized based on a determination that the POS location corresponds to the stored information related to the one or more defined geographical zones.

At step S512, the card or mobile transaction may be automatically declined based on a determination that the POS location does not correspond to the stored information related to the defined one or more geographical zones.

Figure 6:
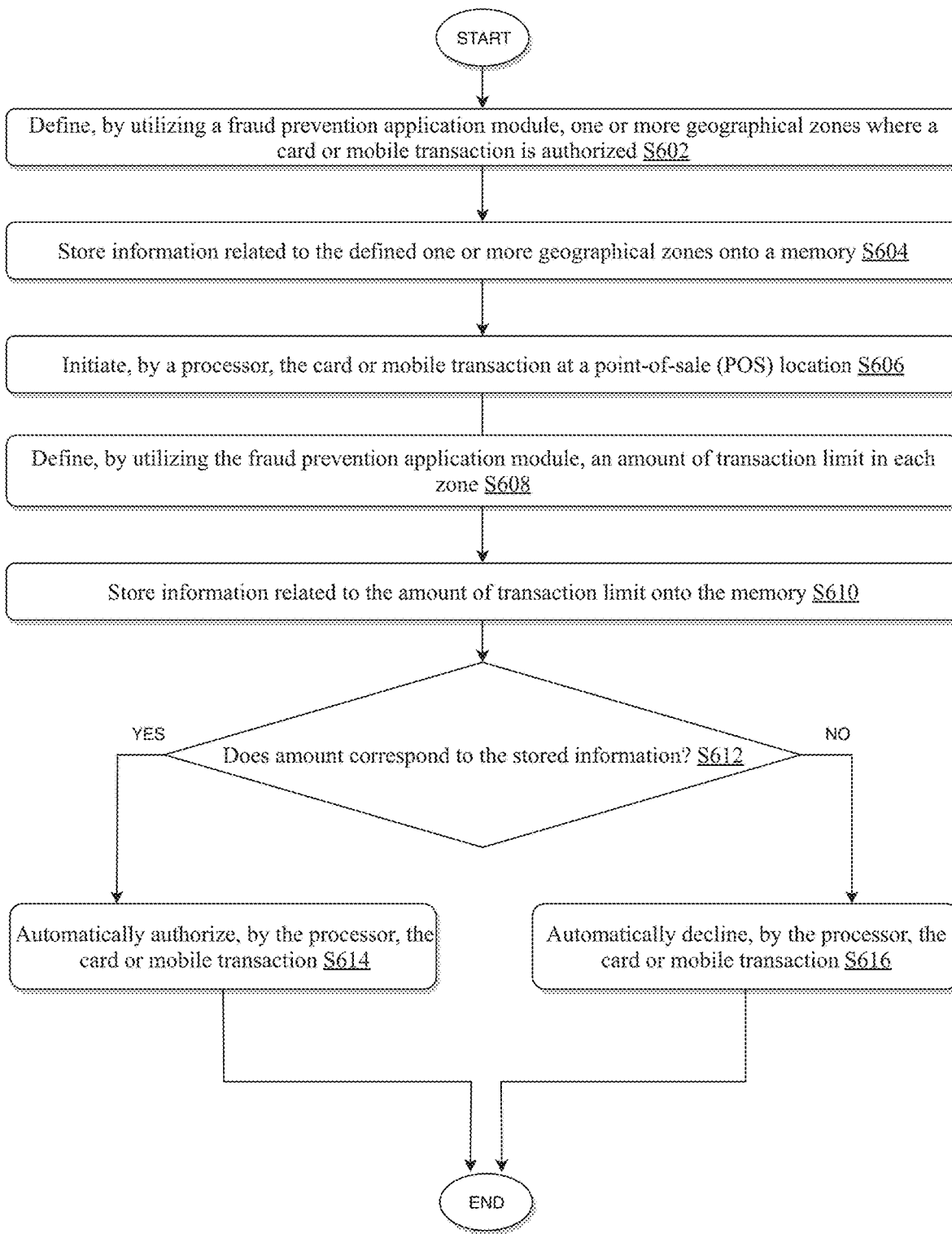
FIG. 6 illustrates a flow diagram for implementing a fraud prevention application module in accordance with an exemplary embodiment.

FIG. 6 illustrates a flow diagram for implementing a fraud prevention application module in accordance with another exemplary embodiment.

According to exemplary embodiments, in the process 600 of FIG. 6, at step S602, one or more geographical zones are defined where a card or mobile transaction is authorized by utilizing a fraud prevention application module. The fraud prevention application module may be the same or similar to the fraud prevention module 202 as illustrated in FIG. 2 of the fraud prevention module 303 as illustrated in FIG. 3, but the disclosure is not limited thereto.

At step S604, information related to the defined one or more geographical zones may be stored onto a memory. According to exemplary embodiments, the memory may be the same or similar to the memory 106 as illustrated in FIG. 1.

At step S606, a processor may initiate the card or mobile transaction at a point-of-sale (POS) location.

At step S608, an amount of transaction limit in each zone may be defined.

At step S610, information related to the amount of transaction limit may be stored onto the memory 106.

At step S612, a processor may determine whether an amount of transaction initiated by the processor at the POS corresponds to the stored information related to the amount of transaction limit associated with a zone corresponding to the POS among the one or more defined geographical zones.

At step S614, the processor may automatically authorize the card or mobile transaction based on a determination that an amount of transaction initiated by the processor at the POS corresponds to the stored information related to the amount of transaction limit associated with a zone corresponding to the POS among the one or more defined geographical zones.

At step S616, the processor may automatically decline the card or mobile transaction based on a determination that the amount of transaction initiated by the processor at the POS does not correspond to the stored information related to the amount of transaction limit associated with a zone corresponding to the POS among the one or more defined geographical zones.

Figure 7:
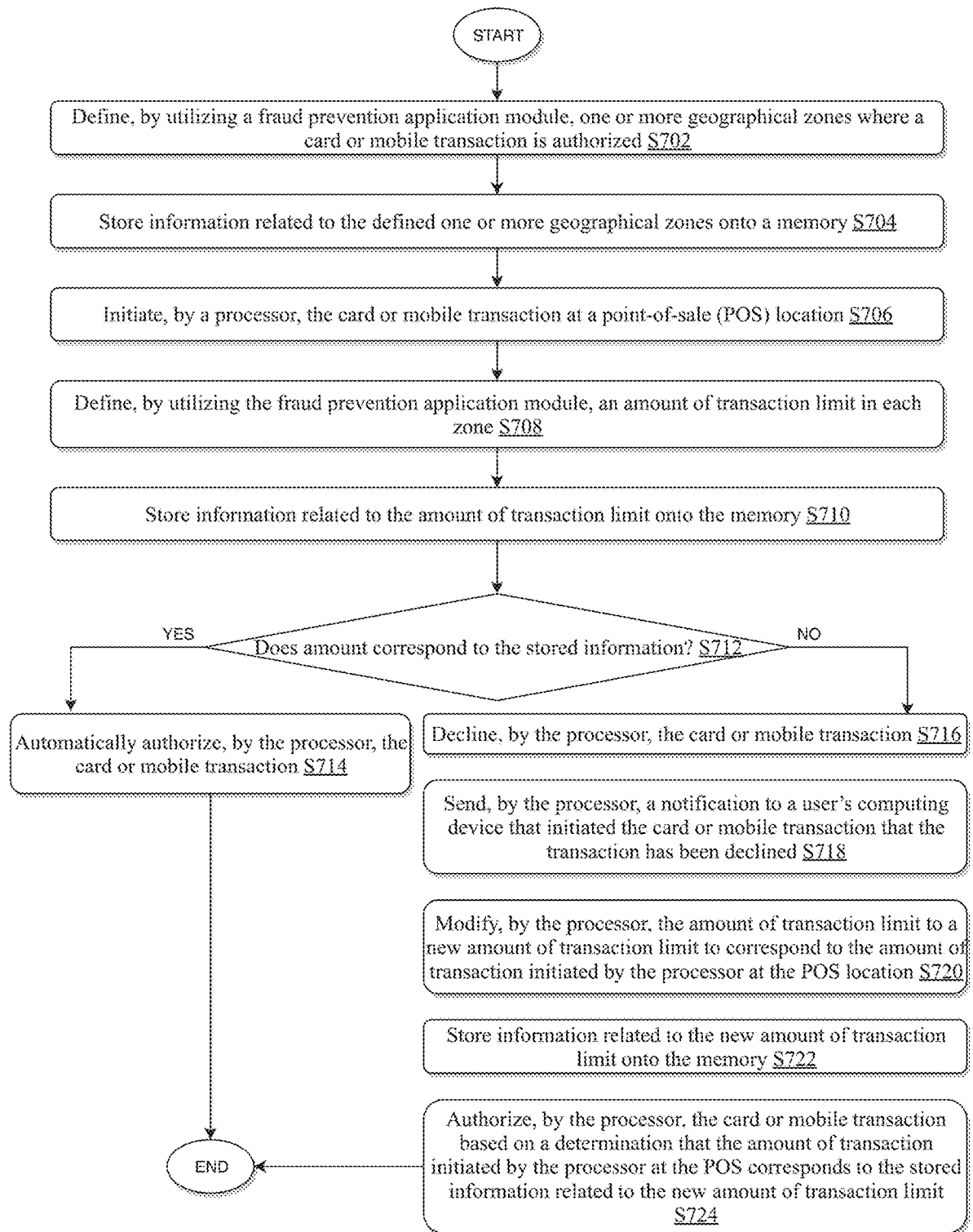
FIG. 7 illustrates a flow diagram for implementing a fraud prevention application module in accordance with an exemplary embodiment.

FIG. 7 illustrates a flow diagram for implementing a fraud prevention application module in accordance with an exemplary embodiment.

According to exemplary embodiments, in the process 700 of FIG. 7, at step S702, one or more geographical zones are defined where a card or mobile transaction is authorized by utilizing a fraud prevention application module. The fraud prevention application module may be the same or similar to the fraud prevention module 202 as illustrated in FIG. 2 of the fraud prevention module 303 as illustrated in FIG. 3, but the disclosure is not limited thereto.

At step S704, information related to the defined one or more geographical zones may be stored onto a memory. According to exemplary embodiments, the memory may be the same or similar to the memory 106 as illustrated in FIG. 1.

At step S706, a processor may initiate the card or mobile transaction at a point-of-sale (POS) location.

At step S708, an amount of transaction limit in each zone may be defined.

At step S710, information related to the amount of transaction limit may be stored onto the memory 106.

At step S712, a processor may determine whether an amount of transaction initiated by the processor at the POS corresponds to the stored information related to the amount of transaction limit associated with a zone corresponding to the POS among the one or more defined geographical zones.

At step S714, the processor may automatically authorize the card or mobile transaction based on a determination that an amount of transaction initiated by the processor at the POS corresponds to the stored information related to the amount of transaction limit associated with a zone corresponding to the POS among the one or more defined geographical zones.

At step S716, the processor may decline the card or mobile transaction based on a determination that the amount of transaction initiated by the processor at the POS does not correspond to the stored information related to the amount of transaction limit associated with a zone corresponding to the POS among the one or more defined geographical zones.

At step S718, the processor may send a notification to a user's computing device that initiated the card or mobile transaction that the transaction has been declined.

At step S720, the processor may modify the amount of transaction limit to a new amount of transaction limit to correspond to the amount of transaction initiated by the processor at the POS location.

At step S722, information related to the new amount of transaction limit may be stored onto the memory.

At step S724, the processor may authorize the card or mobile transaction based on a determination that the amount of transaction initiated by the processor at the POS corresponds to the stored information related to the new amount of transaction limit.

According to exemplary embodiments, the process 500, 600, or 700 as disclosed herein may further include: declining, by the processor, the card or mobile transaction based on a determination that the POS location does not correspond to the stored information related to the defined one or more geographical zone; sending, by the processor, a notification to a user's device that initiated the card or mobile transaction that the transaction has been declined; and defining, by utilizing the fraud prevention application module, a new geographical zone to correspond to the POS location that does not correspond to the stored information related to previously defined one or more geographical zones; updating, by the processor, the memory by storing the new geographical zone; and authorizing, by the processor, the card or mobile transaction based on a determination that the POS location corresponds to the stored information related to the defined new geographical zone.

According to exemplary embodiments, the process 500, 600, or 700 as disclosed herein may further include: declining, by the processor, the card or mobile transaction based on a determination that the POS location does not correspond to the stored information related to the defined one or more geographical zones; sending, by the processor, a notification to a user's device that initiated the card or mobile transaction that the transaction has been declined; receiving an authorization from the user's device to process the card or mobile transaction even though the POS location does not correspond to the stored information related to the defined one or more geographical zones; and authorizing, by the processor, the card or mobile transaction based on the received authorization from the user's device.

According to exemplary embodiments as disclosed above in FIGS. 1-7, technical improvements effected by the instant disclosure may include platforms for implementing a fraud prevention application module between a client device (e.g., card owner's device) and a server device (e.g., an issuer of the card's device). The various aspects, embodiments, features, and/or sub-components disclosed herein with respect to FIGS. 1-7 may provide optimized processes of implementing a fraud protection application module to allow a customer to participate or define geo-zones where transaction may be approved or limit the amount of transactions as customer may have best information on where they "plan" to use the card. The server device (i.e., issuing bank's device) may use this information in addition to other analytical requirements which the server device may implement to detect or limit fraud and determine whether to approve or deny card transactions.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for preventing fraud in card or mobile transaction by utilizing one or more processors and one or more memories, the method comprising:
   defining, by utilizing a fraud prevention application module, one or more geographical zones where a card or mobile transaction is authorized;
   storing information related to the defined one or more geographical zones onto a memory;
   initiating, by a processor, the card or mobile transaction at a point-of-sale (POS) location;

determining, by the processor, whether the POS location corresponds to the stored information related to one or more of the defined geographical zones; and automatically authorizing, by the processor, the card or mobile transaction based on a determination that the POS location corresponds to the stored information related to the one or more defined geographical zones, wherein the method further includes:

declining, by the processor, the card or mobile transaction based on a determination that the POS location does not correspond to the stored information related to the defined one or more geographical zone;

sending, by the processor, a notification to a user's device that initiated the card or mobile transaction that the transaction has been declined;

defining, in real time, in response to receiving the notification by the user's device, by utilizing the fraud prevention application module, a new geographical zone to correspond to the POS location that does not correspond to the stored information related to previously defined one or more geographical zones;

updating, by the processor, the memory by storing the new geographical zone; and authorizing, by the processor, the card or mobile transaction based on a determination that the POS location corresponds to the stored information related to the defined new geographical zone.

2. The method according to claim 1, further comprising:

defining, by utilizing the fraud prevention application module, an amount of transaction limit in each zone;

storing information related to the amount of transaction limit onto the memory; and authorizing, by the processor, the card or mobile transaction based on a determination that an amount of transaction initiated by the processor at the POS corresponds to the stored information related to the amount of transaction limit associated with a zone corresponding to the POS among the one or more defined geographical zones.

3. The method according to claim 2, further comprising:

automatically declining, by the processor, the card or mobile transaction based on a determination that the amount of transaction initiated by the processor at the POS does not correspond to the stored information related to the amount of transaction limit associated with a zone corresponding to the POS among the one or more defined geographical zones.

4. The method according to claim 2, further comprising:

declining, by the processor, the card or mobile transaction based on a determination that the amount of transaction initiated by the processor at the POS does not correspond to the stored information related to the amount of transaction limit associated with a zone corresponding to the POS among the one or more defined geographical zones;

sending, by the processor, a notification to a user's computing device that initiated the card or mobile transaction that the transaction has been declined;

modifying, by the processor, the amount of transaction limit to a new amount of transaction limit to correspond to the amount of transaction initiated by the processor at the POS location;

storing information related to the new amount of transaction limit onto the memory; and authorizing, by the processor, the card or mobile transaction based on a determination that the amount of transaction initiated by the processor at the POS corresponds to the stored information related to the new amount of transaction limit.

5. The method according to claim 1, further comprising:

declining, by the processor, the card or mobile transaction based on a determination that the POS location does not correspond to the stored information related to the defined one or more geographical zones;

sending, by the processor, a notification to a user's device that initiated the card or mobile transaction that the transaction has been declined;

receiving an authorization from the user's device to process the card or mobile transaction even though the POS location does not correspond to the stored information related to the defined one or more geographical zones; and authorizing, by the processor, the card or mobile transaction based on the received authorization from the user's device.

6. A system for preventing fraud in card or mobile transaction, the system comprising:

a memory; and a processor operatively connected to the memory via a communication network, wherein the processor is configured to:

define one or more geographical zones where a card or mobile transaction is authorized;

store information related to the defined one or more geographical zones onto the memory;

initiate the card or mobile transaction at a point-of-sale (POS) location;

determine whether the POS location corresponds to the stored information related to one or more of the defined geographical zones; and automatically authorize the card or mobile transaction based on a determination that the POS location corresponds to the stored information related to the defined one or more geographical zones, wherein the processor is further configured to:

decline the card or mobile transaction based on a determination that the POS location does not correspond to the stored information related to the defined one or more geographical zones;

send a notification to a user's device that initiated the card or mobile transaction that the transaction has been declined;

define, in real time, in response to receiving the notification by the user's device, a new geographical zone to correspond to the POS location that does not correspond to the stored information related to previously defined one or more geographical zones;

update the memory by storing the new geographical zone; and authorize the card or mobile transaction based on a determination that the POS location corresponds to the stored information related to the defined new geographical zone.

7. The system according to claim 6, wherein the processor is further configured to:

define an amount of transaction limit in each zone;

store information related to the amount of transaction limit onto the memory; and authorize the card or mobile transaction based on a determination that an amount of transaction initiated by the processor at the POS corresponds to the stored information related to the amount of transaction limit associated with a zone corresponding to the POS among the one or more defined geographical zones.

8. The system according to claim 7, wherein the processor is further configured to:
   automatically decline the card or mobile transaction based on a determination that the amount of transaction initiated by the processor at the POS does not correspond to the stored information related to the amount of transaction limit associated with a zone corresponding to the POS among the one or more defined geographical zones.

9. The system according to claim 7, wherein the processor is further configured to:
   decline the card or mobile transaction based on a determination that the amount of transaction initiated by the processor at the POS does not correspond to the stored information related to the amount of transaction limit associated with a zone corresponding to the POS among the one or more defined geographical zones;
   send a notification to a user's device that initiated the card or mobile transaction that the transaction has been declined;
   modify the amount of transaction limit to a new amount of transaction limit to correspond to the amount of transaction initiated by the processor at the POS location;
   store information related to the new amount of transaction limit onto the memory; and
   authorize the card or mobile transaction based on a determination that the amount of transaction initiated by the processor at the POS corresponds to the stored information related to the new amount of transaction limit.

10. The system according to claim 6, wherein the processor is further configured to:
    decline the card or mobile transaction based on the determination that the POS location does not correspond to the stored information related to the defined one or more geographical zones;
    send a notification to a user's device that initiated the card or mobile transaction that the transaction has been declined;
    receive an authorization from the user's device to process the card or mobile transaction even though the POS location does not correspond to the stored information related to the defined one or more geographical zones; and
    authorize the card or mobile transaction based on the received authorization from the user's device.

11. A non-transitory computer readable medium configured to store instructions for preventing fraud in card or mobile transaction, wherein when executed, the instructions cause a processor to perform the following:
    defining, by utilizing a fraud prevention application module, one or more geographical zones where a card or mobile transaction is authorized;
    storing information related to the defined one or more geographical zones onto a memory;
    initiating, by a processor, the card or mobile transaction at a point-of-sale (POS) location;
    determining, by the processor, whether the POS location corresponds to the stored information related to one or more of the defined geographical zones; and
    automatically authorizing, by the processor, the card or mobile transaction based on a determination that the POS location corresponds to the stored information related to the one or more defined geographical zones,
    wherein when executed, the instructions further cause the processor to perform the following:
    declining, by the processor, the card or mobile transaction based on a determination that the POS location does not correspond to the stored information related to the defined one or more geographical zone;
    sending, by the processor, a notification to a user's device that initiated the card or mobile transaction that the transaction has been declined; and
    defining, in real time, in response to receiving the notification by the user's device, by utilizing the fraud prevention application module, a new geographical zone to correspond to the POS location that does not correspond to the stored information related to previously defined one or more geographical zones;
    updating, by the processor, the memory by storing the new geographical zone; and
    authorizing, by the processor, the card or mobile transaction based on a determination that the POS location corresponds to the stored information related to the defined new geographical zone.

12. The non-transitory computer readable medium according to claim 11, wherein when executed, the instructions further cause the processor to perform the following:
    defining, by utilizing the fraud prevention application module, an amount of transaction limit in each zone;
    storing information related to the amount of transaction limit onto the memory; and
    authorizing, by the processor, the card or mobile transaction based on a determination that an amount of transaction initiated by the processor at the POS corresponds to the stored information related to the amount of transaction limit associated with a zone corresponding to the POS among the one or more defined geographical zones.

13. The non-transitory computer readable medium according to claim 12, wherein when executed, the instructions further cause the processor to perform the following:
    automatically declining, by the processor, the card or mobile transaction based on a determination that the amount of transaction initiated by the processor at the POS does not correspond to the stored information related to the amount of transaction limit associated with a zone corresponding to the POS among the one or more defined geographical zones.

14. The non-transitory computer readable medium according to claim 12, wherein when executed, the instructions further cause the processor to perform the following:
    declining, by the processor, the card or mobile transaction based on a determination that the amount of transaction initiated by the processor at the POS does not correspond to the stored information related to the amount of transaction limit associated with a zone corresponding to the POS among the one or more defined geographical zones;
    sending, by the processor, a notification to a user's computing device that initiated the card or mobile transaction that the transaction has been declined;
    modifying, by the processor, the amount of transaction limit to a new amount of transaction limit to correspond to the amount of transaction initiated by the processor at the POS location;
    storing information related to the new amount of transaction limit onto the memory; and
    authorizing, by the processor, the card or mobile transaction based on a determination that the amount of transaction initiated by the processor at the POS corresponds to the stored information related to the new amount of transaction limit.

* * * * *